(12) United States Patent
Afshar

(10) Patent No.: US 11,911,718 B2
(45) Date of Patent: Feb. 27, 2024

(54) SELF CLEANING FILTER SYSTEM AND METHOD

(71) Applicant: Asia Connection LLC, New York, NY (US)

(72) Inventor: Reza Afshar, Westlake Village, CA (US)

(73) Assignee: Asia Connection LLC, New York, NY (US)

( * ) Notice: Subject to any disclaimer, the term of this patent is extended or adjusted under 35 U.S.C. 154(b) by 0 days.

(21) Appl. No.: 18/196,049

(22) Filed: May 11, 2023

(65) Prior Publication Data

US 2023/0277961 A1    Sep. 7, 2023

Related U.S. Application Data

(62) Division of application No. 17/108,321, filed on Dec. 1, 2020, now Pat. No. 11,684,876.

(60) Provisional application No. 62/969,767, filed on Feb. 4, 2020.

(51) Int. Cl.
| | |
|---|---|
| *B01D 29/64* | (2006.01) |
| *B01D 29/21* | (2006.01) |
| *B01D 35/16* | (2006.01) |
| *C02F 1/00* | (2023.01) |
| *C02F 103/42* | (2006.01) |

(52) U.S. Cl.
CPC ......... *B01D 29/6438* (2013.01); *B01D 29/21* (2013.01); *B01D 35/16* (2013.01); *C02F 1/001* (2013.01); *B01D 2201/081* (2013.01); *B01D 2201/12* (2013.01); *C02F 2103/42* (2013.01); *C02F 2201/006* (2013.01); *C02F 2303/16* (2013.01)

(58) Field of Classification Search
CPC .... B01D 29/6438; B01D 29/21; B01D 35/16; B01D 2201/081; B01D 2201/12; B01D 2201/291; B01D 2201/303; C02F 1/001; C02F 2103/42; C02F 2201/006; C02F 2303/16

See application file for complete search history.

(56) References Cited

U.S. PATENT DOCUMENTS

| | | | | |
|---|---|---|---|---|
| 6,156,213 A | * | 12/2000 | Dudley .................. | B01D 41/04 210/791 |
| 10,145,136 B2 | | 12/2018 | Saccoccio et al. | |

FOREIGN PATENT DOCUMENTS

DE    202006005677 U1    7/2006

\* cited by examiner

*Primary Examiner* — Waqaas Ali
(74) *Attorney, Agent, or Firm* — Dilworth & Barrese, LLP

(57) ABSTRACT

A filter apparatus includes a filter, such as a cartridge, positioned within a housing. The filter apparatus has multiple ports and valves, so as to allow a user to easily switch between a filtration mode of filtering fluids and a maintenance mode of cleaning the filter. The filter can have a filter substrate in a housing and after filtrate builds up on the substrate, the substrate can be cleaned by directing a spray of fluid, such as from a ring of nozzles at the top of the housing, onto the substrate. A maintenance port can be provided to drain the debris washed from the substrate. The filter can switch between a backwash mode and a filtration mode.

21 Claims, 5 Drawing Sheets

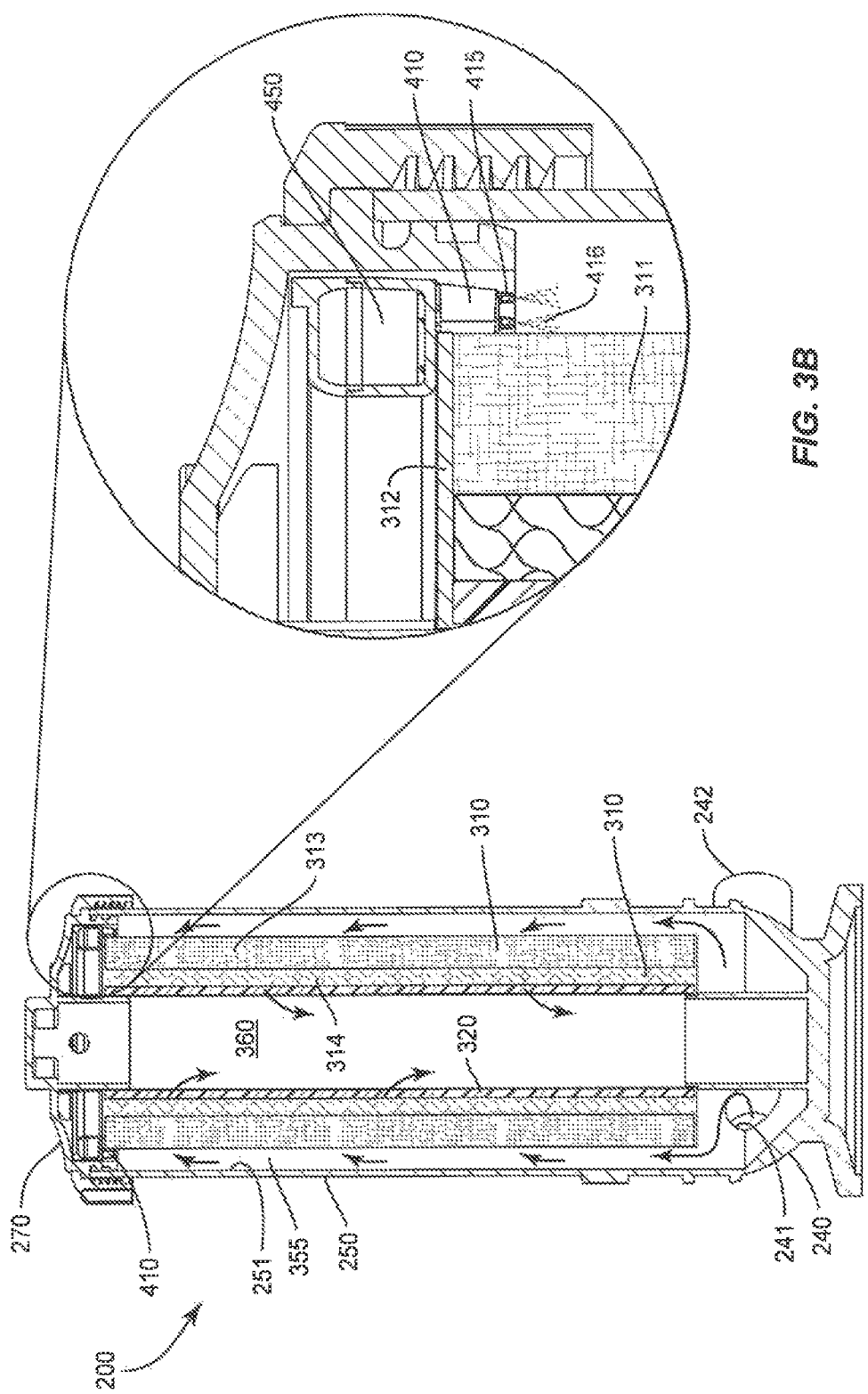

SELF CLEANING FILTER SYSTEM AND METHOD

CROSS REFERENCE TO RELATED APPLICATIONS

This application claims priority as a division of nonprovisional application Ser. No. 17/108,321, filed Dec. 1, 2020, which itself claims the benefit of provisional application Ser. No. 62/969,767, filed Feb. 4, 2020. The contents of these applications is incorporated herein by reference

BACKGROUND OF THE INVENTION

The present disclosure relates generally to filters for liquids and other fluids and more particularly to an easier and more convenient and efficient system and method for cleaning and operating a filter. Filters in accordance with the invention are particularly well suited for filtering the water from a swimming pool, hot tub, spa and the like.

There are various types of filtration systems used to filter fluids such as water from a swimming pool. Conventional filters can take the form of a canister, which can be cylindrical in shape. Filtration material, such as a fan-pleat substrate can be positioned inside the inner surface of the canister. Water can enter the cannister and flow outside of the filtration material, then through the filtration material, and then the filtered water can flow out of the canister and back to the pool. Debris becomes trapped in the filtration material. Eventually, too much filtrate builds up in the filter and some type of filter maintenance is needed to return the filter to optimum operation.

One conventional filter is described in U.S. Pat. No. 10,145,136, the contents of which are incorporated herein by reference, in their entirety. FIGS. 1A-1C depict a conventional filter 100, which can be similar to the filter depicted in the above referenced patent. In operation, unfiltered water from a pool is drawn to filter 100 by a pump 160. The unfiltered water enters a cannister housing 124 of filter 100 through an inlet port 140, located at the bottom of housing 124. A filtration cartridge 110, such as a pleated fan-type filter is positioned inside an inner surface 125 of housing 124. Filter 100 also includes an outlet 130 towards the top of housing 124.

During filtration with filter 100, unfiltered pool water from pump 160 enters inlet 140, meets filtration cartridge 110 and is diverted up towards the top of housing 124. The unfiltered water is then forced through filtration cartridge 110 and exits filter 100 via outlet 130. The filtered water is then returned to the pool or subjected to further processing. However, because the unfiltered pool water travels through the filtration material of cartridge 110, debris that was filtered from the water becomes trapped in filtration cartridge 110. Eventually an undesirable buildup of debris requires filter maintenance to ensure proper filter operation.

It can be undesirable and or unpleasant to clean or change filtration material after it becomes embedded with debris. Various replacement and backwashing schemes have been devised. However, none of these procedures have been deemed fully satisfactory. Accordingly, it is desirable to provide an improved filter system that overcomes deficiencies in the prior art.

SUMMARY OF THE INVENTION

Generally speaking, in accordance with the invention, a filter system and method for filtering fluids, particularly liquids and most particularly swimming pool water is provided. The filter system can include both filtration media and jetting nozzles for rinsing debris from the filtration media. The filtering media can include fan pleated filtering media, porous foam sponge type filters, nonwoven fabrics, fiber pads, fleeced polymers, sand, diatomaceous earth, and the like.

During normal filtration mode, the fluid to be filtered (e.g., swimming pool water) is directed into the housing, forced through the filtration media, and then out of the housing. The filtrate remains trapped the filtration media. The filter can include a conduit, such as a ring of nozzles above and just outside of the outside surface of the filtration media, with a plurality of jet nozzles aimed at the filtration media. This conduit can receive unfiltered and/or filtered pool water, which can be used to clean the filtration media. Alternatively, the rinsing water can be supplied from an alternate source, such as a garden hose. In a filter maintenance mode of operating the filter, jets of the fluid from the conduit are directed onto the surface of the media from the multiple jetting nozzles. The filtered debris becomes dislodged from the media by these jets and collects at the bottom of the housing, from which it can be removed, such as through a waste port.

Accordingly, in one embodiment of the invention, water from a swimming pool is directed into a housing cannister and flows from the inner surface of the housing, through the filtration media, such as a filter cartridge, and into a central portion of the housing. The filtered water in the central portion then exits the housing and returns to the pool. A plurality of jet nozzles is disposed around the inside surface at the top of the housing. In a maintenance mode, fluid, such as water, especially pool water from the jets sprays against the outer surface of the filtration media and cleans debris from the media, where it can exit from a port on the bottom of the housing.

Accordingly, a filter apparatus can be adapted to operate more efficiently and clean and maintain the filtration material without the need to remove the filtration material from the filter. Additional valves and ports can be included that switch between filtration and maintenance mode simply by adjustment of a few valves, without having to switch hoses or other components among the various ports. Alternatively, a new source of water can be used to rinse the filter media.

In another embodiment of the invention, a cage support can be disposed inside the filter cartridge. During maintenance mode, the cage provides support and stability to the cartridge to reduce deformation or damage to the cartridge as a result of the water pressure exerted by the jets. A cover assembly of the housing can include a T or Y-valve that allows the changing of the directional flow of the water, such as from filtration mode to maintenance mode by redirecting the water from the filter cannister to the maintenance conduit, where it can be sprayed onto the filtration media.

In another embodiment of the invention, the filter is of a size and constructed of materials and dimensions to be adapted to operate with conventional residential swimming pool filter equipment and pumps.

Other embodiments of the invention will be apparent from the drawings and the specification to follow and the scope of the invention will be indicated in the claims.

BRIEF DESCRIPTION OF THE DRAWINGS

The present disclosure will become more readily apparent from the specific description accompanied by the drawings. The drawings are presented for purposes of illustration only and are not intended to limit the scope of the invention. Like reference numerals are associated with similar structures.

FIG. 3A is a cross-sectional view of the filter of FIG. 2;

FIG. 3B is a partial cross-sectional view of an enlarged portion of the filter of FIG. 3A;

DETAILED DESCRIPTION OF THE PREFERRED EMBODIMENTS

The present disclosure may be understood more readily by reference to the following detailed description of the disclosure taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

A filter for liquids and other fluids, especially unfiltered swimming pool water according to the present disclosure includes a filtration cartridge within a housing. The filter may be attached or coupled to and receive the unfiltered fluid from a pump. The housing can include an upper maintenance assembly coupled to a main cannister. The housing can include a valve assembly configured to direct the flow of unfiltered water to either pass through filtration material in the cannister in a filtration mode and/or to rinse debris and rejuvenate the filtration material by directing the water through an assembly of jetting nozzles to spray the water onto and clean the filtration material in a maintenance mode.

Figure 1A:
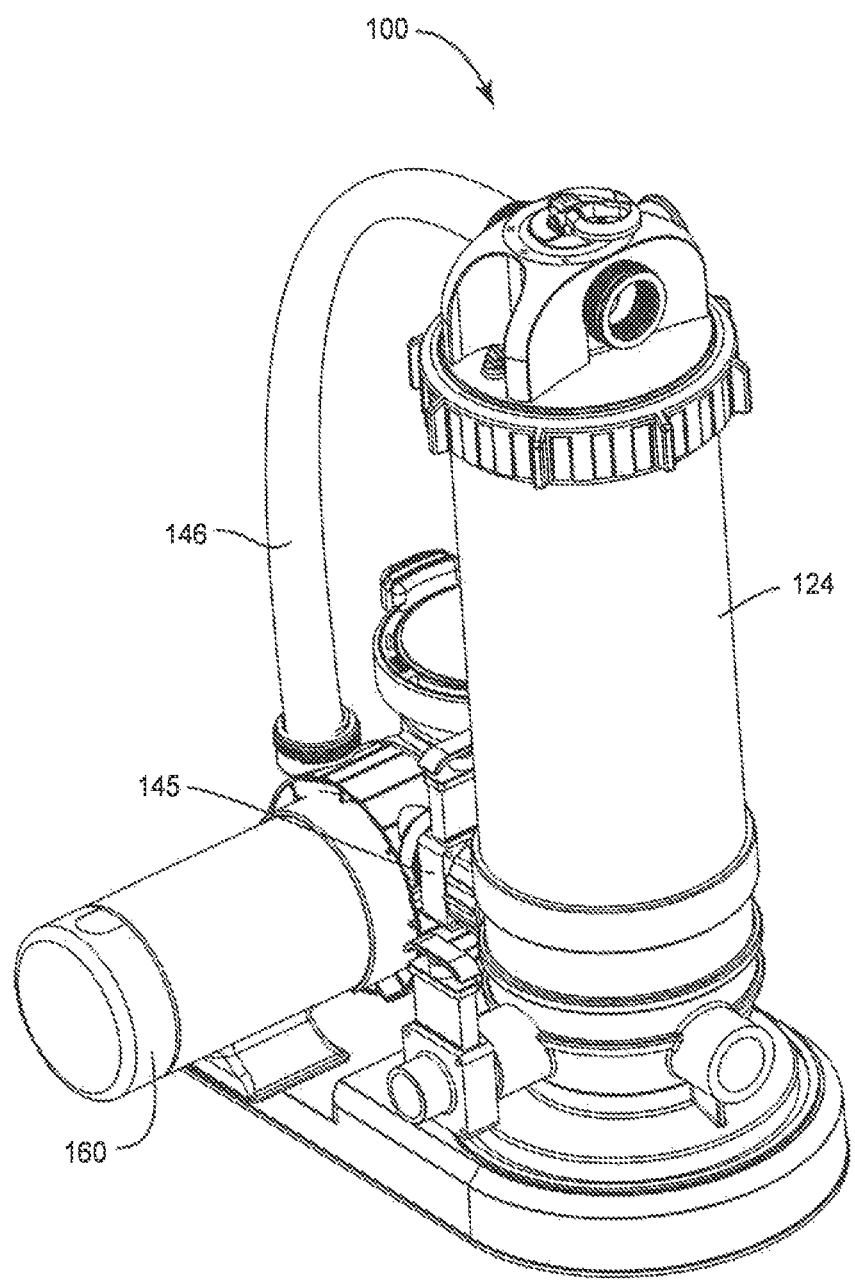
FIG. 1A is a perspective view of a conventional swimming pool filter system.
Figure 1C:
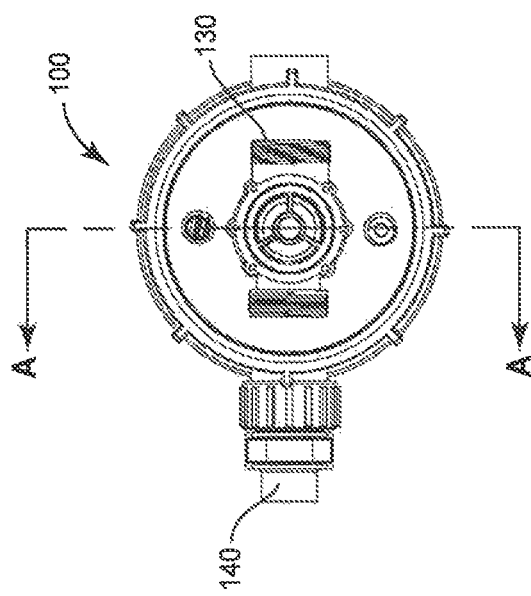
FIG. 1C is a top plan view of the filter of FIG. 1A.
Figure 1B:
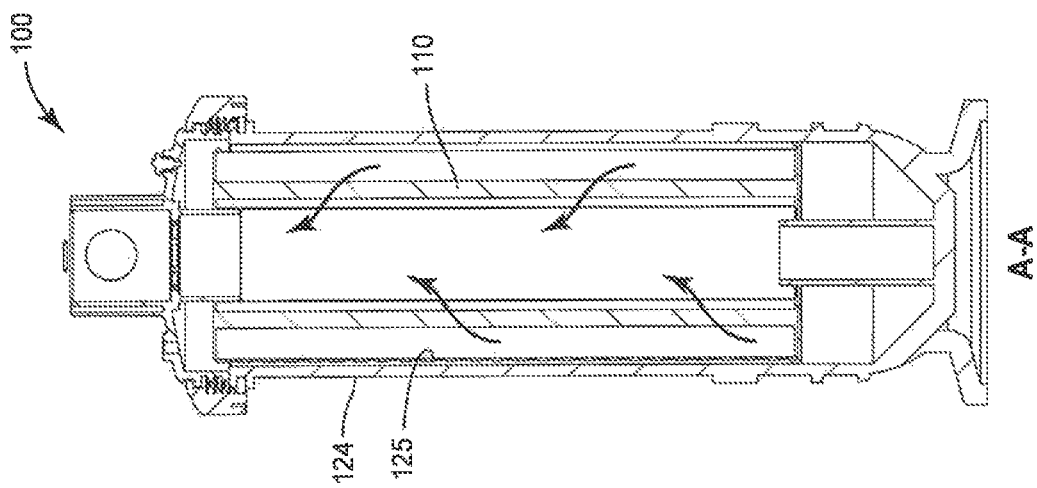
FIG. 1B is a cross-sectional view of the filter of FIG. 1A.

In a preferred embodiment of the invention water from the pump encounters a Y or T-valve. In a filtration mode, the fluid can be directed to pass through the filtration material, then exit in a filtered state. In a maintenance mode, the fluid (or water or other fluid from another source) can be directed to spray onto the filtration media and rinse debris out of the media, where it can exit the housing from a maintenance outlet. In another embodiment of the invention, a pump with two selective outputs, a filtration output 145 and a maintenance output 146 (see, e.g., FIG. 1A) is well suited for systems in accordance with the invention.

Figure 2:
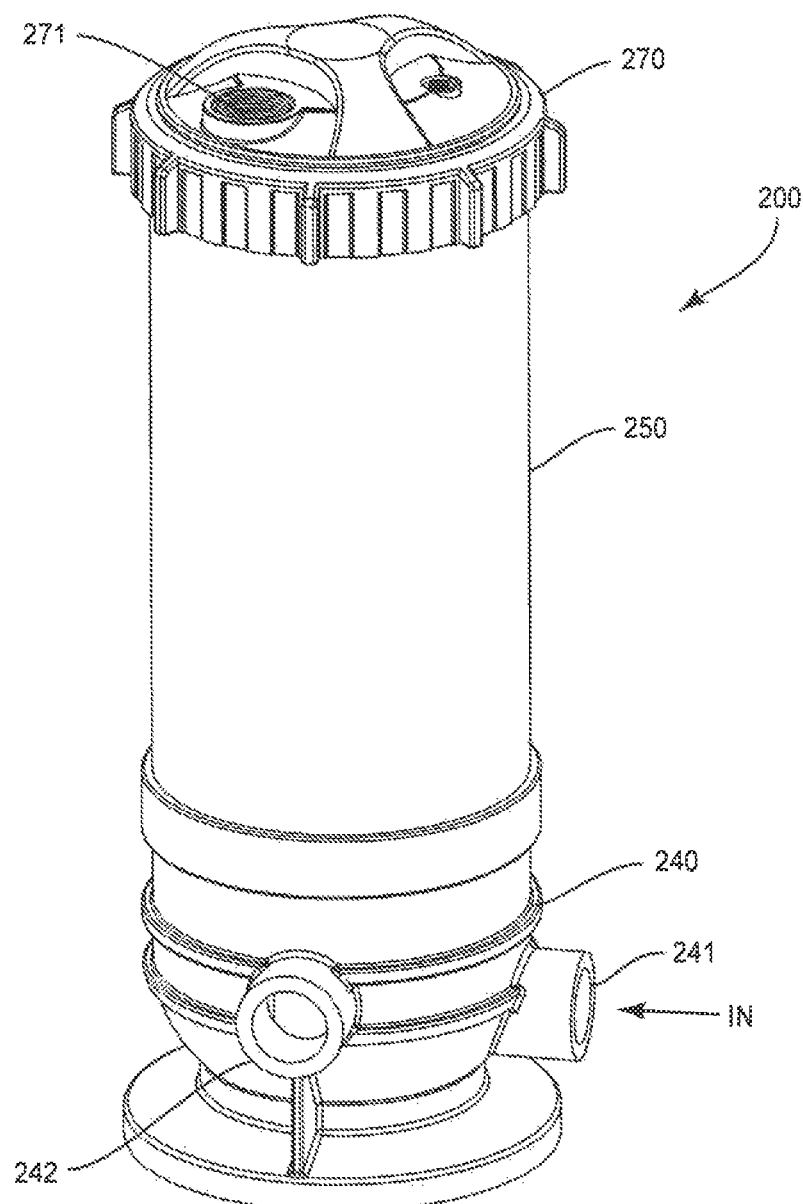
FIG. 2 is a perspective view of a filter in accordance with an embodiment of the invention.
Figure 4A:
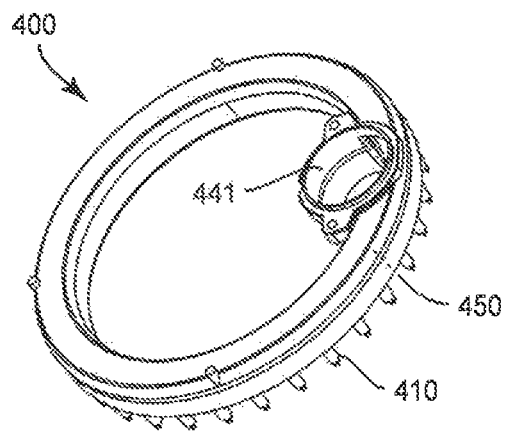
FIG. 4A is a top perspective view of a filter maintenance ring in accordance with an embodiment of the invention.
Figure 4B:
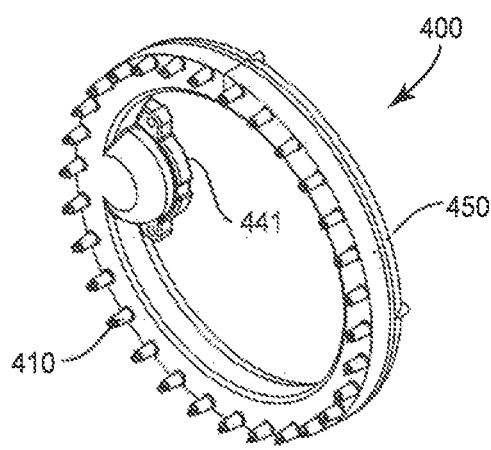
FIG. 4B is a bottom perspective view of the ring of FIG. 4A.
Figure 4C:
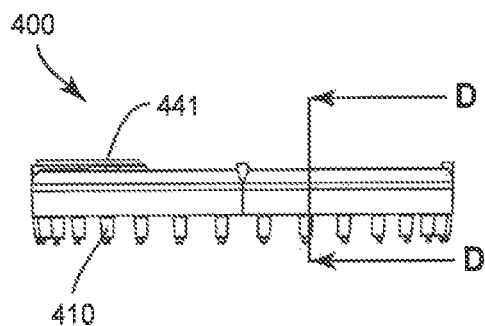
FIG. 4C is a side view of the ring of FIG. 4A.
Figure 4D:
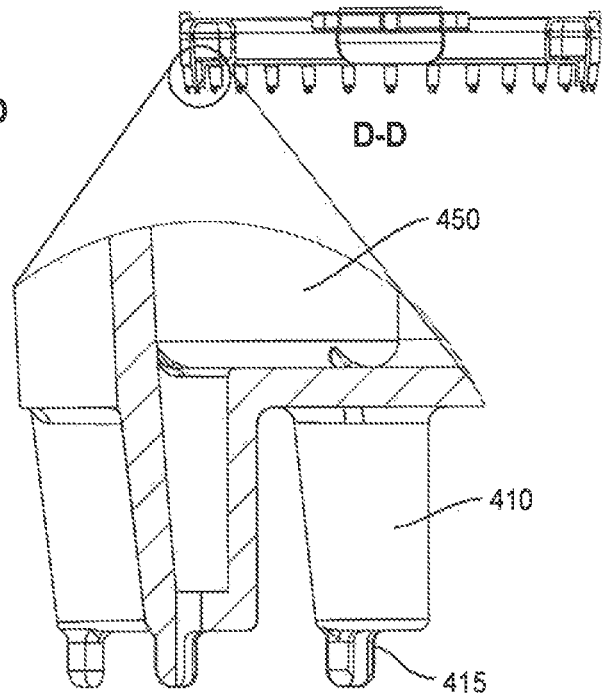
FIG. 4D is a partial cross-sectional view of an enlarged portion of the ring of FIG. 4A.

A dual mode filtration and maintenance system in accordance with a preferred embodiment of the invention is shown generally as a filter 200 in FIG. 2. Filter 200 includes a lower assembly 240, a main canister 250 and an upper assembly 270 releasably attached to main canister 250. Screw threads, seals and O-rings can be included to provide a suitable seal. Lower assembly 240 can include a filtration inlet port 241 and a filtration outlet port 242. Unfiltered pool water enters filter 200 through inlet 241, is filtered within main canister 250, as discussed below, and then filtered water is returned to the pool from filtration outlet port 242.

Upper assembly 270 includes a maintenance water inlet port 271. To operate filter 200 in a maintenance mode, water or other fluid is directed to maintenance water inlet port 271. The source of fluid can be water redirected from inlet 241. Alternatively, filtered water can be directed from outlet 242 to port 271 or water or another fluid can be supplied to maintenance inlet 271. From inlet port 271, the fluid is used to clean debris from filtration material within main canister 250, as discussed below.

Referring to FIGS. 3A and 3B, unfiltered water enters filter 200 through inlet 241 and then travels up in empty space 355 circumscribed by an inside surface 251 of canister 250. After empty space 255 fills, the unfiltered water is forced through a filter cartridge 310, which is mounted about a filter cartridge central support core 320. Filter support core 320 can be tube shaped and can be perforated or cage-like, with sufficient distributed openings to permit water to pass evenly from empty space 355, through filter cartridge 310 and into a central conduit 360.

Filtration material in accordance with the invention can take various forms. For example, a porous foam structure, a woven or nonwoven fabric structure, a mat of fibrous material such as natural or synthetic fibers are appropriate. Alternatively, the filtration material can comprise constrained particles, such as sand, diatomaceous earth, zeolite particles, activated charcoal and the like in either a fluidized on non-fluidized condition. The filtration material can also take the form of porous ceramic material or other solid material.

One preferred filtration material has the form of filter cartridge 310, which is a pleated fan filter, formed from porous synthetic or natural fabric 311, bonded to a plastic support cap 312. Pleated fan filter 310 comprises a plurality of fins 313 extending from a central portion 314 to present a continuous mass of filtration material around filter core 320. Thus, as unfiltered water (or other fluid) travels from inlet 241 through filter cartridge 310, debris and other filterable material will be trapped on or within cartridge 310.

As filtrate becomes trapped in filter cartridge 310, the debris initially builds up on an outer surface of filter 310. As use continues, filter cartridge 310 can become clogged, lose its effectiveness and require maintenance, which involves either replacing cartridge 310 or removing the trapped filtrate therefrom.

Upper assembly 270 contains a fluid conduit in the form of maintenance ring 400. Ring 400 includes an inlet 441 in fluid communication with a central conduit 450 defined by ring 400. Inlet 441 can receive unfiltered water by diverting all or a portion of the stream for filter inlet 241. Alternatively, inlet 441 can receive filtered water diverted from filter outlet 242 or other appropriate cleaning fluids from appropriate sources. In one embodiment of the invention, a garden hose (not shown) is connected to inlet 441. From ring inlet 441, the water travels through central conduit 450 around the entire circumference of main canister 250. Maintenance ring 400 includes a plurality of nozzles 410 extending downward into empty space 355. Each nozzle 410 is in fluid communication with, and receives water from central conduit 450. Each nozzle 410 includes a jet tip 415 sized to project a spray 416 onto filter cartridge 310. Although ring 400 is circular in shape, other shapes that position jet tips 415 to spray fluid onto the used filtration media are suitable. The amount of water and water pressure supplied to ring inlet 441 should be effective for spray 416 to dislodge material from filter 310 and provide cleaning maintenance to substantially extend the useful filtration life of filter 310.

Referring now to FIGS. 3A, 3B, and 4A-4D, ring inlet 441 can have a diameter from about 1 to 3.5 inches, preferably about 1.5 to 3 inches, then tapers down to about 0.5 to 2, more preferably about 0.75 to 1.5 inch in diameter. Central conduit 450 through ring 400 can have a diameter from about 1 to 0.5 inches, preferably about 0.8 to 0.6 inches. Each jet tip 415 can have a diameter from about 0.04 to 0.08 inches, preferably about 0.05 to 0.06 inches. The spray rate of water from jet tips onto filter cartridge 310 should be about 5 GPM to 50 GPM, more preferably about 20-50 GPM. The tips 415 should be angled to spray the water at about 7.0° to 0° with respect to the longitudinal axis of filter cartridge 310, preferably about 6.0° to 3.0°, most preferably about 4.0° to 5.0°.

Filter 200 can be sized for conventional residential pool filtration. For example, the inner diameter of cannister 250 should be about 7 to 11 inches, preferably 8 to 10 inches. The outer diameter of ring 400 should be about 7 to 11 inches, more preferably about 8 to 9 inches. The diameter of central conduit 360 should be about 2.5 to 4.5, more preferably about 3 to 4 inches. Filter cartridge 310 should have a thickness, from core to edge, of about 2 to 5 inches, preferably about 3 to 4 inches.

During operation, water is ejected from jet tip 415 at from about 0.2 GPM to 2 GPM, preferably about 0.5 GPM to 1.5 GPM. Preferred embodiments include at least 20, preferably more than 30 and most preferably 20-60 nozzles 410. It can be advantageous for there to be one nozzle tip 415 for at least every 3, preferably 2 and most preferably 1 fold in cartridge 310.

Filter 200 may be connected to a swimming pool, spa or other source of fluids and liquids to be filtered. Alternatively, filter 200 can be used as an in-line filter for air, water and the like. For example, in one embodiment of the invention, one pipe or set of pipes may deliver water from the pool to pump 160 and then to filter 200, and then another pipe or set of pipes delivers water from filter 200, back to the pool. This circuit continues so that filter 200 continues filtering and cleaning the water from the pool. Similarly, the filter can be a continuous in-line filter.

Lower assembly 240 can also include a third port, i.e., a maintenance outlet, not shown, but similar to outlet 242. The maintenance outlet and outlet 242 can be controlled by valves, as is well known in the art (see, e.g., U.S. Pat. No. 10,145,136). During normal filtration operation, this maintenance valve of the maintenance outlet is closed and water exits through outlet 242. During maintenance mode, the maintenance outlet is opened and filtration outlet 242 can be closed. In maintenance mode, the maintenance outlet can be opened and as the water sprayed from jet tips 415, the water with any debris washed from filter cartridge 310 can exit from the maintenance outlet. A valve at filter outlet 242 can be closed to prevent the debris dislodged from filtration material 310 during maintenance mode from travelling back to the pool. These valves can be coupled, so that only one is open or closed at time. As an alternative, during maintenance mode, filtration outlet port 242 may be closed and the maintenance outlet can be connected to a separation tank, which catches particles within the water. Otherwise, it can lead to a drain or lawn and so forth.

Inlet port 241 and outlet port 242 can be formed with a valve assembly, and can be exposed so that a user is able to access and control the inlet and outlet ports. Upper assembly 270 can include a pressure gauge and/or pressure relief valve or other attachments. Assembly 270 can be removed from main cannister 250 to change filtration cartridge 310 or otherwise service filter 200. Thus, cover 270 and cannister 250 can include complementary threads so that cover 270 can be screwed to cannister 250. Other clip and clamp-type attachments are acceptable. Appropriate O-rings and other seals are will known in the art and can be used as needed.

A diverter valve may be coupled to inlet 241 to divert water as the water leaves pump 160. Based on which port of the valve assembly is opened or closed by the diverter valve assembly, filter 200 may operate in either filtration mode or maintenance mode. It should be understood that various mechanisms, all well known in the art for altering the functionality of filter 200 are also possible. For example, other types of controls, whether mechanically based or electronically based, may control and adjust the mode of the filter.

By having two outlet ports, namely outlet port 242 and the maintenance outlet port, which can be connected to a drain or otherwise, a user does not need to switch tubes, hoses, clamps, etc. when switching between maintenance mode and filtration mode. Furthermore, pool filter 200 itself is simplified by having these two outlet ports. The advantage of such a system not only reduces manufacturing cost and complexity of filter 200 itself, but also reduces the work by a user when switching between filtration and maintenance mode.

Furthermore, pump 160 is able to deliver water to both inlet port 241 and ring inlet 441 by having two ports to direct the water. For example, as described in U.S. Pat. No. 10,145,136, a pool pump that includes two outlet ports, one coupled to filter inlet 241 and one coupled to ring inlet 441. The water from pump 160 will be directed based on which inlet is opened and closed on the filter. As an alternative, another diverter valve may be implemented on pump 160, such as a T-valve or Y-valve, that is able to open and close the ports to filter 200.

Various types of filtration material can be used for cartridge 310. Preferred is a fan-pleat substrate (e.g., Reemay® Material), chain link webbing, mesh reinforced polyethylene end caps can be used, and one or more reinforced pleat bands surrounding at least a portion of cartridge 310 are acceptable. Chain link webbing may be comprised of metal, plastic, etc., and provides for more efficient use of the fan-pleat substrate material. Chain link webbing may be positioned along an inner diameter of cartridge 310, and also on at least one of a top and bottom of cartridge 310. When water flows through cartridge 310, chain link webbing helps keep spacing within the pleats, so that the pleats do not collapse. By maintaining the spacing in between the pleats, fan-pleat substrate filter cartridge 310 is able to gather more waste, debris, etc. when filtering the water. In addition, since the pleats do not collapse as a result of the chain link webbing cartridge 310 overall is able to last longer than if chain link webbing was not employed.

Central filter support core 320 can be positioned within a central cavity of cartridge 310, defined by an inner central perimeter of cartridge 310. Central core 320 should be at least partially positioned within the cavity of cartridge 310, and extends at least partially along a longitudinal axis of the cavity. Central core 320 may be comprised of metal, plastic or any other material sufficient to provide support to cartridge 310 when under water pressure. Central core 320 helps provide support for the internal portion of cartridge 310, such that when water flows from an outside portion of cartridge 310 through cartridge 310 to an inside portion of cartridge 310, cartridge 310 will not collapse.

In addition, the holes, openings, spaces and the like through central core 320 allow for uniformly distributed water on all sides of cartridge 310. For example, water may travel through the holes of central core 320, thereby allowing the water to travel uniformly through cartridge 310. The more stable pleats as a result of the various reinforcements, such as the chain link webbing, allows for even water flow and distribution of the filtered dirt on the pleated substrate. It should be noted, however, that the present disclosure is not restricted to a particular cartridge, filter media, or brand of pleats, but rather any filter may be implemented with filter 200 in order to implement the technology disclosed herein. For instance, the cartridge may be a sand cartridge, charcoal cartridge, etc. which may also work with the present disclosure.

The design of central core 320 is not limited to any particular shape or size, and the openings therein are not restricted to a particular design, shape, size or amount as well. For example, central core 320 may be designed to fit the overall structure of cartridge 310 to provide support to that particular cartridge 310. In addition, although the length of central core 320 may correspond to a specific length of cartridge 310, it does not have to so long as central core 320 is capable of providing support to cartridge 310. Alternatively, if openings are only over a portion of core, 320, differently sized cartridges can be used as long as the cover the openings. Central core 320 may only protect portions of cartridge 310, such as portions of cartridge 310 that tend to damage quickest. In a further embodiment, cartridge 310 may come pre-installed within central core 320. In addition, although a cylindrical shape is shown, any number of shapes and sizes are available as well, including circular, square, rectangular, etc.

In an additional embodiment of the invention, multiple central cores may also be used and combined within the cavity of cartridge 310, each central core having a different or same design (e.g., amount, size, and shape of openings, overall strength of central core, etc.), as described above. For example, if two central cores are used, then a first central core may have smaller openings relative to a second central core, which has larger openings. As another example, the first central core may have triangular openings and the second central core may have circular openings. Any number of these combinations of different sizes and shaped central cores are possible. Furthermore, one section of the cartridge and central core may receive more water pressure than other sections of the cartridge and central core. Therefore, using more than one central core around the cartridge may make it easier to replace just that one section of the central core as opposed to an entirely new central core when only a section thereof has been damaged.

As discussed above, caps on the top and bottom of cartridge 310 may provide additional support to the upper and lower regions. For example, a cap and base may prevent water flow from damaging the ends of cartridge 310.

As a result of the foregoing, a user is able to easily switch between filtration mode and maintenance mode simply by adjusting a few valves or couplings, without having to switch tube connections among various ports. For example, the user can open and close a small number of valves to adjust the filter from a filtration mode to the filter cleaning maintenance mode, such as by adjusting a diverter within the filter and closing the filtration ports and opening the filter cleaning ports. The user simply has to allow the water and waste to exit the filter from the maintenance outlet port.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A method of operating a filter to remove debris from a fluid stream, comprising the steps of:
   filtering a fluid stream within a filtration housing having a top end above a bottom end, and building up a mass of the filtered debris from the fluid stream to a filter substrate within the housing during a first filtering mode of operation;
   after the first filtering mode of operation, directing a spray of fluid tangentially downward onto an outside surface of the filter substrate and dislodging the debris from the filter substrate during a maintenance mode of operation; and
   after the maintenance mode of operation, filtering the fluid stream with the filter substrate during a second filtering mode of operation;
   wherein the spray is directed from an assembly of nozzles positioned at the top of the housing;
   wherein the nozzle assembly comprises a conduit having multiple nozzles thereon, the nozzles spray the jets of fluid onto the filtration substrate and the filtration substrate comprises a pleated fan-type filter cartridge having multiple folds of filtration material with the pleats having a fold line and a flat surface extending along a longitudinal axis of the housing and there is one nozzle for every three or fewer pleats, spraying the fluid along a longitudinal axis of the pleats.

2. The method of claim 1, wherein during the first filtering mode of operation, the fluid stream comprises water drawn from a swimming pool and the filtered fluid stream is returned to the swimming pool, and comprising during maintenance mode, closing the flow of water from the swimming pool to the filter substrate and draining the debris from a maintenance port in the housing, the maintenance port not in fluid communication with the swimming pool.

3. The method of claim 1, wherein the spray rate from the nozzles is from about 5 to 50 gallons per minute.

4. The method of claim 1, wherein the filter substrate comprises a pleated fan-type filter cartridge having multiple folds of filtration material with the pleats having a f old line and a flat surface extending along a longitudinal axis of the pleats and the spray is directed substantially along the longitudinal axis.

5. The method of claim 4, wherein the spray is directed at an angle of about 0 to 7 degrees to the longitudinal axis.

6. The method of claim 1, wherein the filter substrate comprises at least one member selected from the group consisting of fan pleated filtering media, porous foam sponge type filters, nonwoven fabrics, fiber pads, fleeced polymers, sand, diatomaceous earth, and combinations thereof.

7. The method of claim 1, wherein during the maintenance mode of operation, the spray of fluid is water from the swimming pool.

8. The method of claim 1, wherein during the maintenance mode of operation, the spray of fluid is water from a source other than the swimming pool.

9. The method of claim 1, wherein a cage support is disposed on the filter substrate and during the maintenance mode of operation, the cage provides support and stability to the filter substrate and reduces deformation of the substrate as a result of the fluid spray.

10. The method of claim 1, wherein the housing includes a valve and the filter is switched from filtration mode to maintenance mode by operating the valve.

11. The method of claim 1, wherein the filter substrate comprises diatomaceous earth.

12. The method of claim 1, wherein the filter substrate comprises a pleated fan-type filter cartridge having multiple folds of filtration material with the pleats having a fold line and a flat surface extending along a longitudinal axis of the housing and the inside diameter of the housing substantially corresponds to the outside diameter of the filter cartridge with space therebetween for fluid to travel.

13. The method of claim 1, wherein the filter substrate is substantially cylindrical and the nozzle assembly is substantially circular.

14. The method of claim 13, wherein the nozzles are substantially the same distance from a center of the housing as an outer surface of the filter substrate and spray the fluid onto an outside surface of the filter substrate.

15. The method of claim 2, wherein the maintenance port is opened and drains the housing.

16. The method of claim 1, wherein the nozzle assembly comprises a conduit having multiple nozzles thereon.

17. The method of claim 16, wherein the conduit has a diameter of about 0.5 to 1 inch.

18. The method of claim 16, wherein there are at least 20 nozzles distributed around the inside surface of the top end of the housing.

19. The method of claim 16, wherein the nozzles tips have openings with a diameter of about 0.04 to 0.08 inches.

20. The method of claim 16, wherein there are at least 30 nozzles distributed around the inside surface of the conduit.

21. The method of claim 1, wherein the nozzles spray at an angle of about 0 to 7 degrees from the longitudinal axis of the pleats.

* * * * *